April 5, 1932.  D. DESMOND ET AL  1,852,837
EYE EXAMINING INSTRUMENT
Filed Jan. 13, 1930
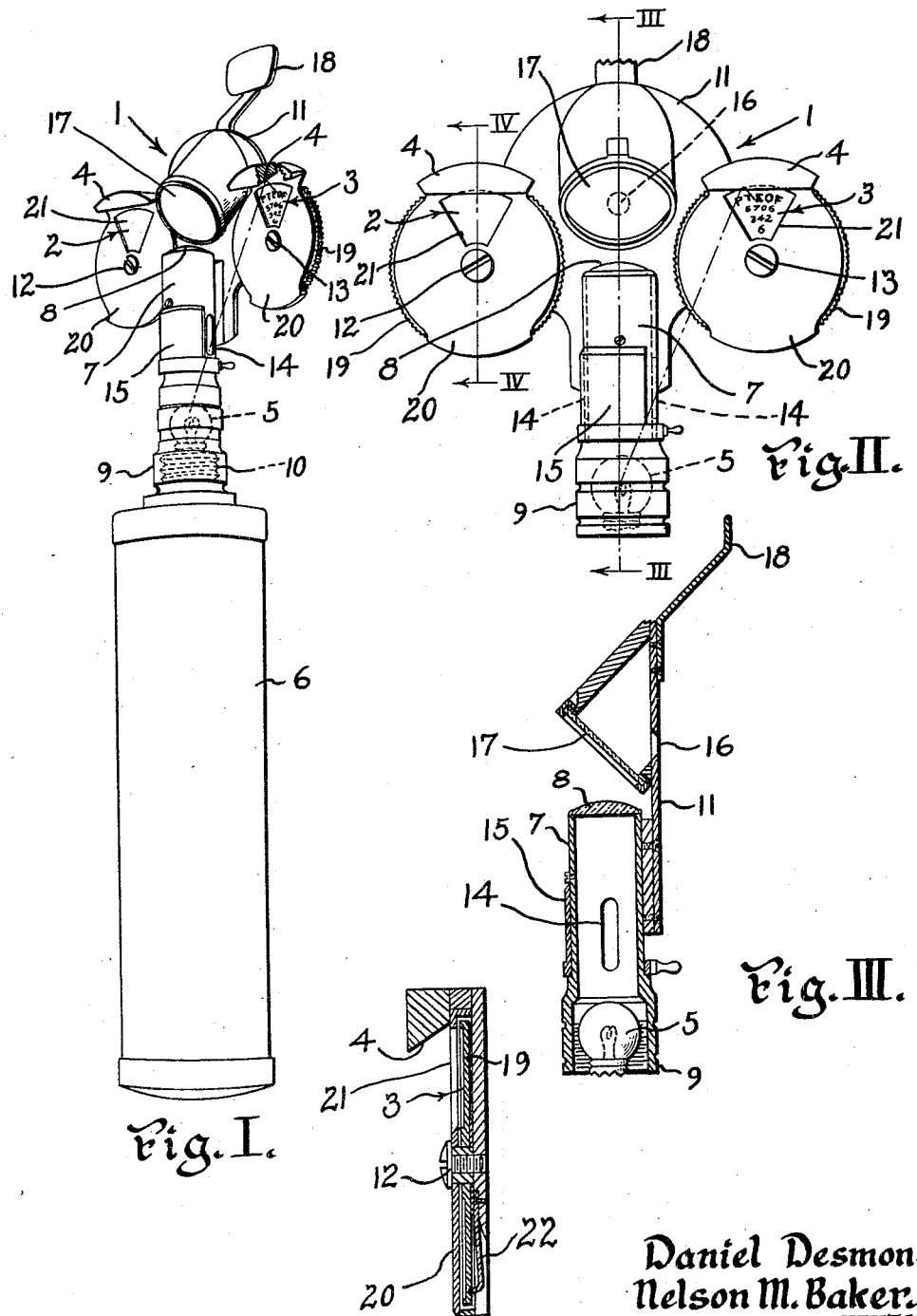
Daniel Desmond.
Nelson M. Baker.
INVENTOR
BY Harry H. Styll.
ATTORNEY Patented Apr. 5, 1932

1,852,837

UNITED STATES PATENT OFFICE

DANIEL DESMOND AND NELSON M. BAKER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS

EYE EXAMINING INSTRUMENT

Application filed January 13, 1930. Serial No. 420,442.

This invention relates to improvements in instruments for examining the eye and has particular reference to that type of instrument wherein the eye under examination is illuminated for observation.

The principal object of the invention is to provide an instrument to obtain ophthalmic corrections of the eye objectively, that is by examination without asking questions of the patient.

Another object of the invention is to provide means whereby the correction may be obtained as nearly as possible along the visual axis of the patient's eye.

Another object of the invention is to provide means to obtain the correction with the least possible amount of false astigmatism.

Another object is to provide two separate improved fixation members to hold the patient's attention and to provide improved means for illuminating the members and for shutting off the illumination selectively therefrom when either of the said fixation members is not in use.

Another object is to position the fixation members relative to the line of observation of the examiner so that the most comfortable and efficient fixation may be obtained.

Other objects and advantages of the invention will become apparent from the following description taken in connection with the accompanying drawings, and it will be apparent that many modifications and changes may be made in the details of construction and arrangement of parts without departing from the spirit of the invention as expressed in the accompanying claims. We, therefore, do not wish to be limited to the exact details shown and described, as the preferred form only has been shown by way of illustration.

The accuracy of ophthalmic lenses has been developed to a very high degree, both in the theory of design and in the mechanical processes of making them. The art of examining the eye has also developed greatly and it is, therefore, the prime object of our invention to provide an improved instrument to increase the accuracy and efficiency of eye testing, particularly in connection with the elimination of false astigmatism.

Referring to the drawings:

Fig. I is a perspective view of a retinoscope embodying the invention showing a portion of one of the reflecting members cut away.

Fig. II is a front view of the head of the instrument.

Fig. III is a cross section on line III—III of Fig. II.

Fig. IV is an enlarged cross section on line IV—IV of Fig. II.

Referring to the drawings wherein similar characters of reference indicate corresponding parts throughout, the invention consists broadly of a retinoscope head 1 having two fixation targets 2 and 3 arranged to be selectively illuminated by the reflecting means 4 and lamp 5 supported by the handle 6.

The retinoscope head 1 comprises a light conducting tube 7 provided at one end with a condensing lens 8 and at the opposite end with an enlarged threaded light receiving chamber 9. The light receiving chamber 9 is adapted to fit over the lamp 5 and be threadedly connected to a threaded neck 10 formed on the handle 6. The tubular member 7 is provided with a support plate 11 on which is pivotally secured at 12 and 13 the fixation targets 2 and 3. The reflectors 4 are positioned above each fixation target directly in line with light passing through suitable openings 14 formed in the tube 7 and are adapted to reflect light to illuminate the targets. A sleeve shutter 15 positioned on the tubular member 7 is adapted to be rotated to open or close the opening 14 on either side of the tube 7 to control the illumination of each target.

A suitable opening 16 formed in the support plate 11 provides means whereby the observer may view the eye to be examined. Positioned on the plate support 11 in line with the axis of the sight opening 16 and axis of the light conducting tube 7 is a transparent or silvered reflector 17 through which the observer may make his examination and by means of which lights coming from the lamp 5 may be reflected into the patient's eye. A head rest 18 attached to the support 11 is adapted to rest against the observer's forehead to steady the instrument during the observation.

The fixation targets 2 and 3 are placed on opposite sides of the sight opening 16 at a position approximately 25 millimeters from the center of the sight opening. This distance between the centers of the charts and the sight opening was found to be the most comfortable and efficient and at the same time gives a relatively small angle of fixation. The fixation targets 2 and 3 are formed by placing a rotatable disc 19 in a housing 20 having a cut away window portion 21 formed therein. The disc 19 is provided with a series of different fixation objects, each of which is selectively alignable with the window 21 by rotation of the disc 19. A spring clip 22 which engages suitable recesses formed in the disc 19 is adapted to hold the fixation object in alignment with the window 21.

The method of operation of the instrument is as follows: If the right eye is to be examined the patient is told to fix both eyes on the fixation target on the left of the instrument and when testing the left eye, vice versa, which fixes both of the patient's eyes while the eye under test is being examined, thus providing binocular fixation. With the two targets arranged one on each side of the axis of the instrument, the eye is made to look at a slight inclination to the line of the projected light which permits the light to be projected into the eye along the axis of the crystaline lens, which will eliminate all false astigmatism.

From the foregoing description it will be seen that we have provided a simple and efficient instrument and effective means for carrying out all the objects of the invention.

Having described our invention, we claim:

1. In a device of the character described, an instrument head having two separately rotatable fixation objects one on each side of the head and rotatable in the plane of said head, a source of light and means on the instrument head for directing light from said light source for illuminating the fixation objects.

2. In a device of the character described, an instrument head having two rotatable fixation objects one on each side of the head, a source of light, a reflector adjacent the top of each fixation object and in line with and adapted to reflect light from the light source to illuminate the fixation objects and means on the instrument head for selectively shutting off the illumination of said fixation objects.

3. In a device of the character described, a source of light, means for directing light from said light source to an object to be examined, a pair of rotatable test indicators one on each side of the light directing means and mounted for rotation in the same plane and a reflector associated with each of the rotatable test indicators for indirect illumination thereof by illumination from said light source.

4. In a device of the character described, a source of illumination, a member having a light passageway leading from the source of illumination and having openings intermediate its ends, means aligned with the light passageway for directing light to an object to be tested, a pair of fixation objects pivotally mounted one on each side of the light directing means, and for rotation in the same plane and means aligned with the openings in the passageway for indirect illumination of the rotatable test objects from light passing through said openings.

5. In a device of the character described, a source of illumination, a member having a light passageway leading from the source of illumination and having openings intermediate its ends, a reflector support on the light passageway, a reflector on the support aligned with the light passageway, a pair of fixation objects pivotally mounted on the support one on each side of the reflector and for rotation in the plane of the support and means associated with the openings in the passageway for directing light from the source of illumination to illuminate the fixation objects.

6. In a device of the character described, a source of light, a member having a light passageway leading from the source of light and having transverse openings in the side walls thereof, a reflector support carried by the light passageway member, a reflector on the support, and aligned with the passageway, rotatable test characters carried by the reflector support and for separate rotation on each side of said reflector and means adjacent each of the rotatable test characters and in line with light coming from the transverse openings for reflecting the said light on to the rotatable test characters to illuminate the same.

7. In a device for throwing a beam of light, a source of light, a member having a light passageway leading from the source of light and having transverse openings in the side walls thereof, a reflector support carried by the light passageway member, a reflector on the support, and aligned with the passageway, rotatable test characters carried by the reflector support for separate rotation on each side of said reflector, a shield plate over the test characters and having a window through which the characters may be seen, reflectors over the windows and in line of the light coming from the transverse openings of the passageway for reflecting said light onto the rotatable test characters visible at the windows to illuminate the same, and means for selectively shutting off the light from said test characters.

8. In a device of the character described, a source of light, a member having a light passageway leading from the source of light and having transverse openings in the side walls thereof, a reflector support carried by the light passageway member and aligned with the passageway, a reflector on the support rotatable test characters carried by the reflector support for separate rotation on each side of said reflector and in the plane of the reflector support and light reflecting means adjacent each of the rotatable test characters, and in line with the light coming from the transverse openings for reflecting the said light onto the rotatable test characters to illuminate the same.

9. In a device of the character described, a source of light, a member having a light passageway leading from the source of light and having transverse openings in the side walls thereof, a reflector support carried by the light passageway member, and aligned with the passageway, a reflector on the support, rotatable test characters carried by the reflector support for separate rotation on each side of said reflector and in the plane of the reflector support, light reflecting means adjacent each of the rotatable test characters and in line with light coming from the transverse openings for reflecting the said light onto the rotatable test characters to illuminate the same and means for selectively shutting off the light from said test characters.

DANIEL DESMOND.
NELSON M. BAKER.